(12) United States Patent
De Nichilo

(10) Patent No.: US 10,220,744 B2
(45) Date of Patent: Mar. 5, 2019

(54) FRONT SEAT BACKREST RELEASE SYSTEM

(71) Applicant: LEAR CORPORATION, Southfield, MI (US)

(72) Inventor: Giovanni De Nichilo, Grugliasco (IT)

(73) Assignee: LEAR CORPORATION, Southfield, MI (US)

( * ) Notice: Subject to any disclaimer, the term of this patent is extended or adjusted under 35 U.S.C. 154(b) by 66 days.

(21) Appl. No.: 15/346,830

(22) Filed: Nov. 9, 2016

(65) Prior Publication Data

US 2018/0126884 A1 May 10, 2018

(51) Int. Cl.
*B60N 2/68* (2006.01)
*B60N 2/64* (2006.01)

(52) U.S. Cl.
CPC .............. *B60N 2/682* (2013.01); *B60N 2/64* (2013.01)

(58) Field of Classification Search
CPC . B60N 2/682; B60N 2/64; B60N 2/68; B60N 2/02; B60N 2/04; B60N 2/10; B60N 2/12; B60N 2/20; B60N 2/22; B60N 2/224; B60N 2/2245
USPC .......................... 297/440.15, 440.1, 310, 311
See application file for complete search history.

(56) References Cited

U.S. PATENT DOCUMENTS

| | | | | |
|---|---|---|---|---|
| 3,549,202 A * | 12/1970 | Boschen | ................... | B60N 2/20 297/378.11 |
| 4,182,533 A * | 1/1980 | Arndt | ..................... | A47C 7/462 297/284.4 |
| 5,570,931 A * | 11/1996 | Kargilis | .................. | B60N 2/206 248/429 |
| 5,597,206 A * | 1/1997 | Ainsworth | ........... | B60N 2/0705 297/317 |
| 6,152,533 A * | 11/2000 | Smuk | ....................... | B60N 2/12 297/341 |
| 7,152,923 B2 * | 12/2006 | Charras | .................. | B60N 2/206 297/378.12 |
| 7,156,461 B2 | 1/2007 | Bolte et al. | | |
| 7,517,022 B2 * | 4/2009 | Habedank | ................ | B60N 2/06 297/15 |

(Continued)

FOREIGN PATENT DOCUMENTS

| | | |
|---|---|---|
| DE | 102005003817 A1 | 8/2006 |
| DE | 102006015138 A1 | 10/2007 |

(Continued)

*Primary Examiner* — Mark R Wendell
(74) *Attorney, Agent, or Firm* — Brooks Kushman P.C.

(57) ABSTRACT

A seatback release system comprising a seat backrest frame with an attached mounting bracket. Secured to the mounting bracket is a handle which pivots about a pivot point. The handle and the mounting bracket cooperate so that the release system can be deployed on a front left or right seat by attaching the handle to one or the other end of the mounting bracket. One or more spring members extend between the mounting bracket and the handle so that the handle is thereby biased to an initial downward position in which the seat backrest frame is locked. A cable mechanism with a proximal end and a distal end extends between the handle and a seatback release subassembly. The core of the cable moves axially within the outer sheath in response to displacement of the handle, thereby releasing the seatback release subassembly.

9 Claims, 3 Drawing Sheets

(56) References Cited

U.S. PATENT DOCUMENTS

| | | | | |
|---|---|---|---|---|
| 8,038,217 B2* | 10/2011 | Yamagishi | ............... | B60N 2/06 297/341 |
| 8,313,147 B2 | 11/2012 | Scheurer | | |
| 8,376,459 B2* | 2/2013 | Kumazaki | ................ | B60N 2/12 297/341 |
| 8,439,444 B2* | 5/2013 | Ngiau | ...................... | B60N 2/12 297/378.12 |
| 8,585,145 B2* | 11/2013 | Nock | ........................ | B60N 2/12 297/331 |
| 8,608,245 B2 | 12/2013 | Wieclawski | | |
| 2011/0156462 A1* | 6/2011 | Lim | ......................... | B60N 2/20 297/354.12 |
| 2016/0107553 A1* | 4/2016 | Imajo | ...................... | B60N 2/68 297/452.18 |
| 2018/0015852 A1* | 1/2018 | Jeong | ..................... | B60N 2/919 |

FOREIGN PATENT DOCUMENTS

| | | |
|---|---|---|
| DE | 102004055350 B4 | 3/2008 |
| DE | 102007058332 A1 | 6/2009 |
| DE | 1020120057 A1 | 7/2013 |
| DE | 102013103640 A1 | 10/2014 |
| EP | 0096858 B1 | 2/1990 |
| FR | 2850914 A1 | 8/2004 |
| FR | 2852272 A1 | 9/2004 |
| FR | 2985955 A1 | 7/2013 |
| JP | 57151438 A | 9/1982 |

\* cited by examiner

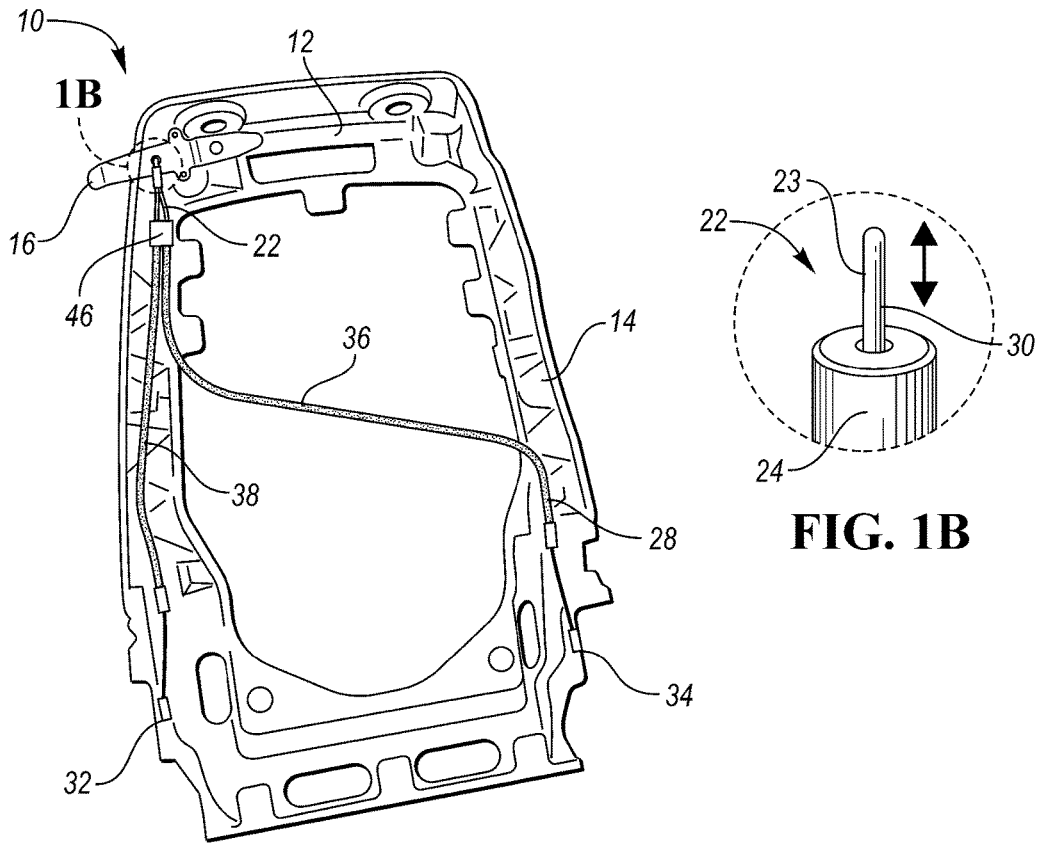
FIG. 1A
FIG. 1B
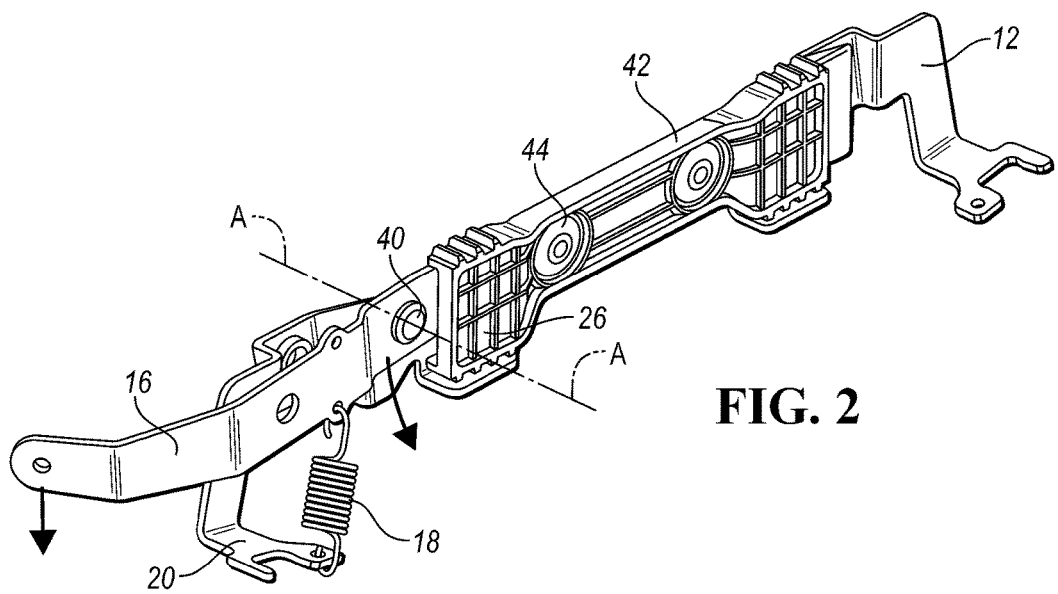
FIG. 2

FRONT SEAT BACKREST RELEASE SYSTEM

TECHNICAL FIELD

One aspect of this disclosure focuses on a front seat backrest release system ("release system") which extends at least partially across the width of a seatback near the upper edge of a left or right front seat. The release system has a handle on the seatback's outboard side.

BACKGROUND

Front seat backrest release systems are disclosed for example in U.S. Pat. No. 7,156,461; U.S. Pat. No. 8,313,147; U.S. Pat. No. 8,608,245; DE 102004055350; DE 102005003817; DE 102006015138; DE 102007058332; DE 102012005737; DE 102013103640; EP 0096858; FR 2850914; FR 2852272; FR 2985955 and JP S57-151438.

SUMMARY

This disclosure relates to a front seat backrest release system ("release system") which extends across some or all of the width of a seatback near the upper edge of a left or right front seat. Preferably the release system has a single handle that extends from the seatback's outboard side. When activated by vertically oriented forces exerted by an operator, the release system permits the seatback to be moved from about 30 degrees aft of an imaginary vertical plane passing through a seatback pivot point and about 20 degrees forward thereof.

One embodiment of the release system is asymmetric: it can be used on either a left or right seat by mounting the handle upon a mounting bracket so that the handle extends from either the left or right side of the seatback.

Several embodiments of the release system cooperate with a cabled mechanism such as a pair of Bowden cables that extend between the handle and a seatback release subassembly located proximate a seatback pivot point. As used herein the term "Bowden Cable" connotes a flexible cable that transmits mechanical forces by the movement of an inner cable relative to an outer hollow cable housing. The outer cable housing may include a tubular helical steel wire or a plastic sheath. Either may be lined with nylon. See, https://en.wikipedia.org/wiki/Bowden_cable.

In a preferred embodiment, the seatback release subassembly is located near the lower edge of the seat back proximate the seatback pivot point. This subassembly includes one latch at each lower corner of the seatback and is, for example, a ratchet and pawl arrangement. The latches are unlocked by the two Bowden cables and thus release the seatback.

If desired, the two Bowden cables are united below the mounting bracket proximate the upper edge of the seatback to enable activation of the seatback release subassembly by a single run of Bowden cable that extends from the mounting bracket to a point of cable bifurcation. Below that point, one cable runs across the seatback and downwardly toward the seatback release subsystem. The other cable runs downwardly toward another release subassembly.

The mounting bracket is attached to the frame of a seat backrest. In one embodiment, a strap member is attached to the mounting bracket. The strap member receives and guides the handle. The handle is pivotably secured proximate one end thereof so that the handle can be moved upwardly and downwardly, perhaps but not necessarily by hand. Further influencing movement of the handle is a spring or elastic member such as a cord or band that extends between a foot of the mounting bracket and the handle. The handle is thereby biased to an initial downward position, in which the seatback is locked.

A cable mechanism hook retainer is attached to an opposite end region of the handle. Thus, the core of the cable moves in response to displacement of the handle.

The release system is actuated by a lifting force (F) applied by an operator to the handle, which is recalled to a rest position by the elastic member that exerts a force R2.

In use, the handle moves the core of the cable and produces a force (R1) when engaging the seat recliner(s) subassembly and thereby releases the backrest. The seatback pivots over a limited arcuate path relative to the seat base when the two reclining subassembly are unlocked and release the seatback. Each recliner subassembly is released by one cable. Preferably, as noted above, the two cables are united at or near the upper edge region of the seatback to enable activation by a single linkage.

In several embodiments, the strap secured to the mounting bracket limits the maximum displacement of the end region of the handle. If the system experiences misuse, an additional stop may be provided under the strap to prevent destruction and consequent malfunction. In this way, the handle is prevented from being twisted in a direction that diverges from a desired plane of smooth movement.

Unlike other designs, which may have up to three fulcrums and three springs, the disclosed system has a handle with only one pivot point. Additionally, the release system is relatively simple to assemble and manufacture cost-effectively. As mentioned above, the release system disclosed can readily deployed on the front left or right seat using a mounting bracket that can accommodate a handle that is affixed to one end region of the bracket or the other.

BRIEF DESCRIPTION OF THE DRAWINGS

FIG. 1A is a view of a front seatback frame with its cover removed to reveal an embodiment of the disclosed release system mounted thereupon, together with an enlarged view of an unattached end of a Bowden cable FIG. 1B;

FIG. 2 is a front quartering perspective view in more detail of a portion of the release system that is affixed proximate an upper edge of a left seatback;

DETAILED DESCRIPTION

Figure 3:
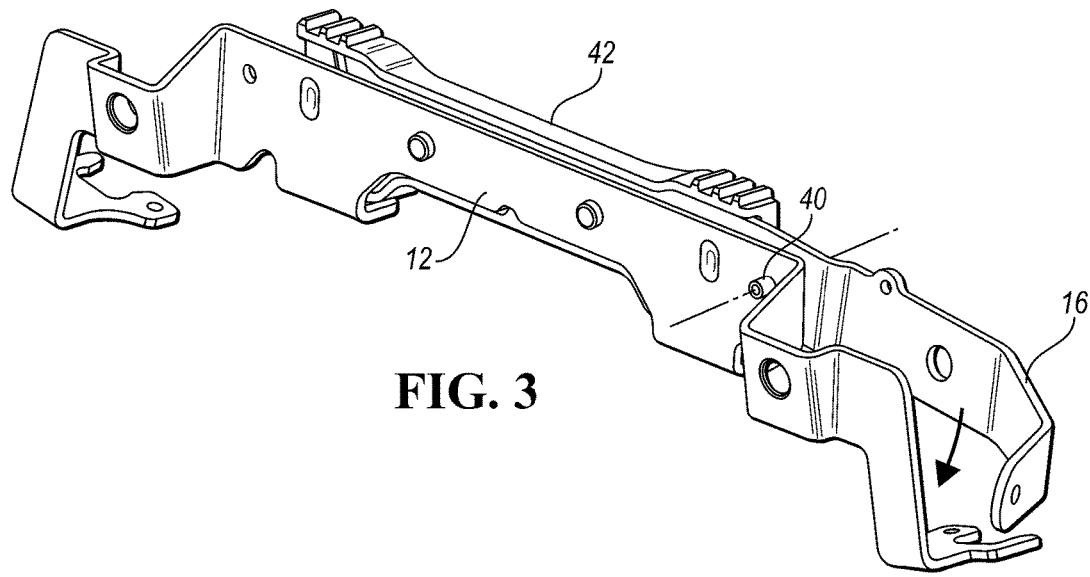
FIG. 3 is a rear perspective view in more detail of a portion of the release system that is affixed to proximate an upper edge of a left seatback.

Referring to FIGS. 1-6, one embodiment of the disclosed release system 10 has a fixed mounting bracket 12 that is attached to a seat backrest frame 14. The bracket 12 supports a handle 16 which pivots about an axis A-A (FIG. 2) that runs through a pivot point 40. The handle 16 is secured proximate one end of the fixed mounting bracket 12 so that the handle 16 can be moved upwardly and downwardly (see, FIG. 4) by an operator. Influencing the handle's movement, a spring or elastic member 18 connects a foot 20 of the mounting bracket 12 to the handle 16. The handle 16 is thereby biased to an initial downward position in which the seat backrest frame 14 is locked. A retainer 42 is optionally provided that is secured by a fastener 44 to the mounting bracket 12.

Figure 4:
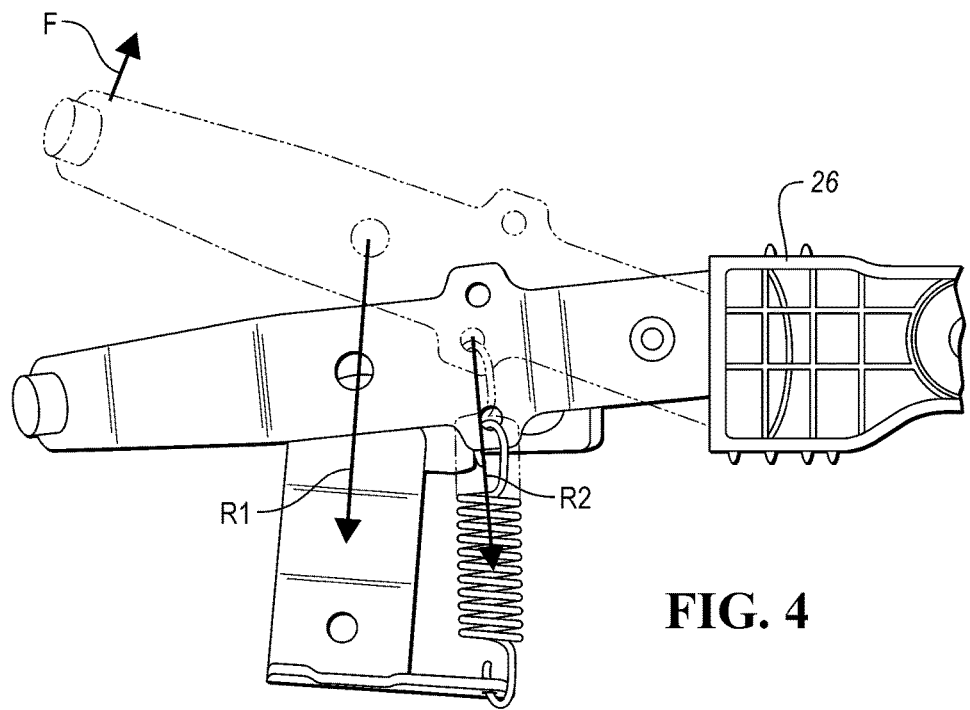
FIG. 4 illustrates displacement of a handle shown in FIGS. 1-3 under the influence of forces exerted by an operator (F), a core of a Bowden cable (R1) and a spring (R2)

Preferably, the release system 10 is actuated by a lifting force F applied manually to the handle 16 which is recalled to a rest position by one or more elastic members 18 which exerts a force R2 (FIG. 4). In alternate embodiments, the mounting bracket 12 is affixed to the seat back frame 14 so that the handle 16 extends from or near a side or upper edge of the seat back frame 14.

A cable 22 has core 23 with a proximal end 30 that is attached to the handle 16. The core 23 moves axially within a sheath 24 in response to displacement of the handle (16, FIG. 1).

One exemplary embodiment of the cable 22 is a Bowden cable. As the force F (FIG. 4) is applied to the handle 16, the handle 16 moves the proximal end 30 of the core 23 of the cable 22 upwardly. The opposing force R2 is applied to the handle 16 by the spring 18. The cable 22 optionally has a distal end 28 that is secured near the lower edge of the seatback frame 14. The distal end 28 of the cable core 23 activates a seatback release subassembly (e.g., a ratchet and pawl arrangement, 34 which is located near the lower edge of the seatback frame 14. When activated the subassembly 34 releases the seat back frame 14 so that it may move arcuately about a pivot axis. The seat backrest frame 14 pivots over a limited arcuate path relative to the seat base when the one or more release subassemblies 34 are unlocked and thus release the seatback.

Conventionally there is a release subassembly 32, 34 located at each of two corners of the lower edge of the seatback frame 14. Preferably, one distal cable end 28 cooperates with each release subassembly 34.

In the embodiment shown in FIG. 1, the cable 22 bifurcates below its proximal end 30. Emerging from the bifurcation, two separate runs of cable 36, 38 respectively extend to the two release subassemblies below. Thus, each release subassembly is influenced by one cable 36, 38. To enable activation by a single core 23, the two cables 36, 38 are united above a point of bifurcation 46 located at the proximal end 30 of the cable 22 at the upper edge region of the seatback 14.

Figure 6A:
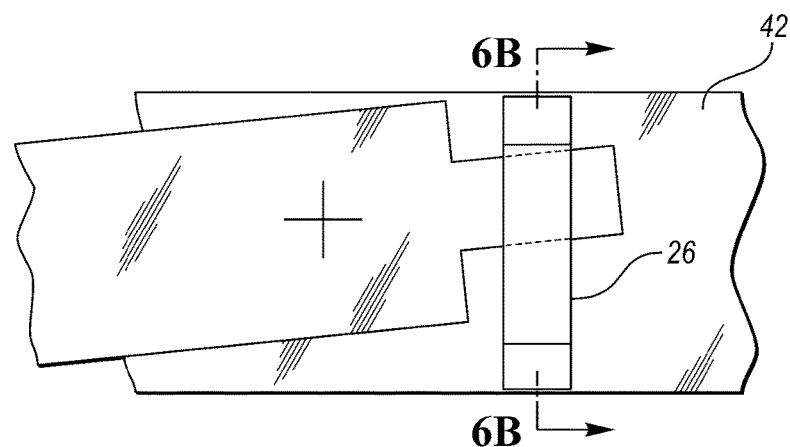
FIG. 6A is a front view of a strap that limits vertical and twisting movement of the handle.
Figure 6B:
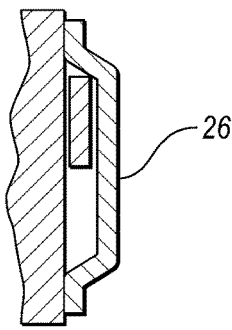
FIG. 6B is a cross sectional view thereof.

Optionally, a strap (26, FIGS. 6A & 6B may be affixed to the retainer 42 or the mounting bracket 12 in order to limit the arcuate displacement of the handle 16. The strap 26 tends to safeguard the release system 10 from damage if subjected to misuse. If additional protection is sought, the strap 26 may include an additional stop under the strap 26 to prevent destruction and consequent malfunction. By such features, the handle 16 is prevented from twisting or excessive vertical movement.

Figure 5:
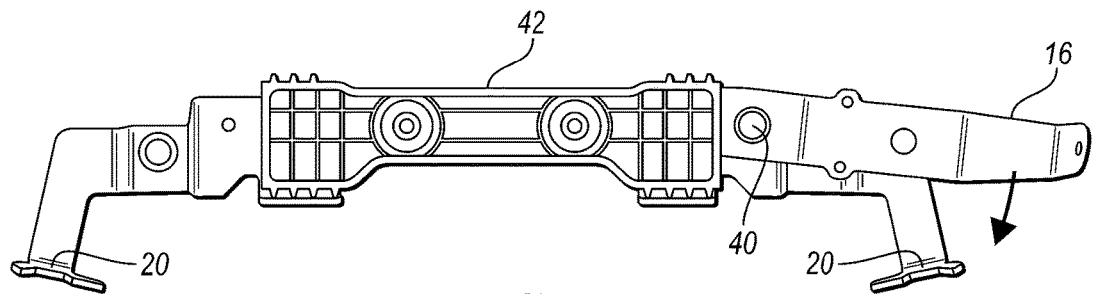
FIG. 5 is a front quartering perspective view in more detail of a portion of the release system that is affixed proximate an upper edge of a right seatback.

As noted above, the backrest release system 10 can be used on either a left or a right seat by attaching the handle 16 to the mounting bracket 12 either on the front left or right seat respectively (FIGS. 2, 5). Thus, the release system 10 disclosed can readily be deployed on the front left or right seat without significant design changes. Unlike other designs, which may have up to three fulcrums and three springs, the disclosed release system has only one pivot point 40 (see, e.g., FIG. 2). Additionally, the release system 10 is relatively simple to assemble and manufacture cost-effectively.

Here is a listing of reference numerals used:
10 Release system
12 Mounting bracket
14 Seat backrest frame
16 Handle
18 Spring or elastic member
20 Foot of mounting bracket
22 Cable
23 Core
24 Sheath
26 Strap
28 Distal end of cable
30 Proximal end of cable
32 Seatback release subassembly
34 Seatback release subassembly
36 Run of cable
38 Run of cable
40 Pivot pin
42 Retainer
44 Fastener
46 Point of bifurcation As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A seatback release system comprising:
a seat backrest frame having a pair of lateral side edges, an upper edge and a lower edge;
a mounting bracket attached proximate the upper edge;
a handle secured to the mounting bracket adjacent one end of the mounting bracket, the handle being pivotable about a generally horizontal pivot axis, so that the handle extends from either a left lateral side edge or right lateral side edge of the seat backrest frame and moves upwardly and downwardly proximate to the lateral side edge, wherein the pivot axis is generally parallel to a longitudinal axis of a vehicle in which the seatback is installed;
a retainer for guiding movement of the handle, the retainer being secured to the mounting bracket;
one or more spring members extending between a foot of the mounting bracket and the handle so that the handle is thereby biased to a downward position in which the seat backrest frame is locked; and
a cable extending downwardly from the handle, the cable having a proximal end and a distal end, the cable having an outer sheath and an inner core,
the core at the proximal end being attached to the to the handle, the core at the distal end being attached to a seatback release subassembly located proximate the lower edge of the seat back frame, the core of the cable being able to move axially within the outer sheath, thereby activating the seatback release subassembly in response to movement of the handle.

2. The seatback release system of claim 1 wherein the seat backrest frame supports a left seat and the handle extends from a left side of the mounting bracket.

3. The seatback release system of claim 1 wherein the seat backrest frame supports a right seat and the handle extends from a right side of the mounting bracket.

4. The seatback release system of claim 1, further including a strap secured to the retainer for additional guiding of handle movement.

5. The seatback release system of claim 1, wherein the one or more spring members comprise one spring member.

6. The seatback release system of claim 1, wherein the cable has a proximal end proximate the upper edge of the seat backrest frame and a distal end proximate the lower edge of the seat backrest frame.

7. The seatback release system of claim 6, wherein the cable is bifurcated below its proximal end so that two cable runs extend below a point of bifurcation, each cable run communicating with a seatback release subassembly located proximate the lower edge of the seatback.

8. The seatback release system of claim 7, wherein each seatback release subassembly comprises a ratchet and pawl mechanism.

9. A method of operating a seatback release system, the seatback being arcuately movable and having a seat backrest frame with a pair of lateral side edges, an upper edge and a lower edge, the method comprising the steps of:

attaching a mounting bracket proximate the upper edge;

securing a handle to the mounting bracket adjacent one end of the mounting bracket, the handle being pivotable about a generally horizontal pivot axis that lies in parallel with a longitudinal axis of a vehicle in which the seatback release system lies, so that the handle can be moved upwardly and downwardly proximate to a lateral side edge;

linking a spring member between the mounting bracket and the handle so that the handle is thereby biased to a downward position in which the seat backrest frame is locked; and running a cable between the handle and a seatback release subassembly located proximate the lower edge of the seat back frame, a core of the cable being movable axially within an outer sheath of the cable, thereby activating the seatback release subassembly in response to movement of the handle.

* * * * *